United States Patent
Tenaglia et al.

(10) Patent No.: US 11,489,848 B2
(45) Date of Patent: Nov. 1, 2022

(54) PERSONAL INFORMATION SKIMMER DETECTION DEVICE

(71) Applicant: Two Six Labs, LLC, Arlington, VA (US)

(72) Inventors: Scott D. Tenaglia, Arlington, VA (US); Joseph S. Tanen, Alexandria, VA (US)

(73) Assignee: Two Six Labs, LLC, Arlington, VA (US)

( * ) Notice: Subject to any disclaimer, the term of this patent is extended or adjusted under 35 U.S.C. 154(b) by 432 days.

(21) Appl. No.: 16/580,019

(22) Filed: Sep. 24, 2019

(65) Prior Publication Data

US 2021/0092133 A1    Mar. 25, 2021

(51) Int. Cl.
| | |
|---|---|
| H04L 9/40 | (2022.01) |
| G06F 21/62 | (2013.01) |
| G06Q 50/26 | (2012.01) |
| G07F 19/00 | (2006.01) |
| G06Q 20/20 | (2012.01) |

(52) U.S. Cl.
CPC ...... H04L 63/1416 (2013.01); G06F 21/6245 (2013.01); G06Q 20/20 (2013.01); G06Q 50/265 (2013.01); G07F 19/2055 (2013.01); H04L 63/1425 (2013.01)

(58) Field of Classification Search
CPC ............ H04L 63/1416; H04L 63/1425; G06Q 50/265; G06Q 20/20; G06Q 20/204; G06Q 20/4016; G06Q 20/206; G06F 21/6245; G06F 21/57; G07F 19/2055; G07F 19/207; H04W 12/126; H04W 12/47

USPC .......................................................... 726/23
See application file for complete search history.

(56) References Cited

U.S. PATENT DOCUMENTS

| | | | |
|---|---|---|---|
| 6,542,927 B2 | 4/2003 | Rhoads | |
| 7,164,413 B2 | 1/2007 | Davis et al. | |
| 8,457,449 B2 | 6/2013 | Rhoads et al. | |
| 8,489,598 B2 | 7/2013 | Rhoads et al. | |
| 10,262,326 B1* | 4/2019 | Yaqub .............. | G06Q 50/265 |
| 2013/0106576 A1* | 5/2013 | Hinman ............ | G06K 7/10267 340/10.1 |
| 2013/0106577 A1* | 5/2013 | Hinman ............ | G06K 7/10267 340/10.1 |
| 2015/0213427 A1* | 7/2015 | Hodges ............. | G07F 19/2055 705/18 |
| 2015/0213428 A1* | 7/2015 | Hodges ............. | H04K 3/822 705/18 |
| 2015/0350914 A1* | 12/2015 | Baxley ............. | H04W 72/0453 726/11 |

(Continued)

Primary Examiner — Badrinarayanan
(74) Attorney, Agent, or Firm — Armis IP Law, LLC

(57) ABSTRACT

A detection device for identification and isolation of unauthorized skimmer/shimmer devices takes the form of a portable electronics package adapted for deployment under or near a point-of-sale (POS) station that may be targeted by such skimmer. The detection device is intended for placement near or adjacent an electronic exchange of personal, financial, and/or sensitive information from a payment card, mobile device, or similar magnetic, optical, or radio frequency medium. Unscrupulous interception devices periodically transmit gathered information for reception. The detection device monitors transmissions for those having characteristics indicative of the unscrupulously gathered information, and renders an output signal alerting to the presence and location of an illicit capture device.

17 Claims, 5 Drawing Sheets

(56) References Cited

U.S. PATENT DOCUMENTS

| | | | |
|---|---|---|---|
| 2015/0371038 A1* | 12/2015 | Batta | H04W 12/12 726/23 |
| 2016/0127931 A1* | 5/2016 | Baxley | H04K 3/22 455/67.16 |
| 2017/0011255 A1* | 1/2017 | Kaditz | G01R 33/48 |
| 2019/0130240 A1* | 5/2019 | Scaife | G06K 19/06196 |

* cited by examiner

PERSONAL INFORMATION SKIMMER DETECTION DEVICE

BACKGROUND

Electronic commerce facilitated by the Internet and availability of inexpensive cashless payment options such as credit cards, personal device barcodes, and RFID payment tokens has given rise to a new opportunity for unscrupulous interception and copying of personal information. Covert devices strategically placed at POS (Point of Sale), ATM (Automated Teller Machines) and similar receptacles of electronic payment media seek to intercept personal information such as bank account numbers, personal identification numbers (PIN), and other information. These covert devices attempt to read or scan a payment token or device as it is inserted or swiped in conjunction with a legitimate payment or exchange. Such illicit capture devices may be placed as overlays or adjacent to legitimate reading devices such that the information is read or "skimmed" without the knowledge of the token owner.

SUMMARY

A detection device for identification and isolation of unauthorized skimmer/shimmer devices takes the form of a portable electronics package adapted for deployment under or near a point-of-sale (POS) device that may be targeted by such skimmer devices. The detection device is intended for placement near or adjacent an electronic exchange of personal, financial, and/or sensitive information from a payment card such as a credit/debit card, mobile device, or similar magnetic, optical, or radio frequency medium. Unscrupulous illicit capture devices periodically transmit gathered information for reception by an actor seeking to use or sell the stolen information. The detection device monitors transmissions for those having characteristics indicative of the unscrupulously gathered information, and renders an output signal alerting to the presence and location of a possible concealed gathering device for subsequent inspection and removal.

Configurations herein are based, in part, on the observation that modern commerce has facilitated POS (Point of Sale) transactions with electronic exchanges that replace conventional cash exchanges. Purchasers can complete payment using an electronically enabled token such as a payment card magnetic strip, embedded chip, RFID (Radio frequency ID) fob, scannable bar code or square code on a mobile device, or other similar magnetic, optical, radio frequency, or transmitted medium. Unfortunately, conventional approaches to electronic monetary transactions suffer from the shortcoming that the required electronic transfer of information is subject to interception by unscrupulously placed emulation or "look alike" devices, often referred to as "skimmers" or "shimmers" that entice an unknowing or unaware user to present their payment token device to an unauthorized reader device that can read and store the payment card, bank account or other sensitive number or information. Such devices may be an overlay form designed to present a similar profile and appearance to the legitimate reader device they seek to emulate, or may be a standalone device having a similar appearance to a legitimate reader. Since the unscrupulous actors who place these skimmer devices prefer not to return to the placement location, these unscrupulous devices typically transmit their captured information. Accordingly, configurations herein substantially overcome the shortcomings of conventional skimmer device detection by scanning transmissions for characteristics commonly associated with the presence of a device or a download of captured, sensitive information. Through analysis of skimmer and shimmer devices, several patterns have emerged that can be employed to distinguish these skimmer transmissions from legitimate transmissions.

In particular configurations, the detector device is operable for detecting and countering an illicit capture device, and includes an antenna for receiving RF signals from the illicit capture device, in which the RF signals include data indicative of personal information of a user, and a modulation circuit for demodulating the received RF signals into packets of data. A processor and memory define logic for receiving and interpreting the data from the packets, such that the logic includes instructions for comparing the data to characteristics of known malicious devices having a capability for covert gathering of personal data, and based on the comparison of one or more of the characteristics, computing a likelihood that the RF signals emanated from an illicit or unauthorized device. The detection device also includes an interface for communicating the computed likelihood of an unauthorized device presence for manual inspection and intervention by a security or oversight staff or monitoring system.

The detection device and associated logic therefore implements a method for detecting spurious communications from an illicit capture device by gathering, at a receiver disposed in a monitored environment, RF signals suspected of transporting suspect data, and analyzing the RF signals for an indication that the RF signals emanated from an illicit device. Multiple transmission features are considered such that analyzing further includes deriving one or more characteristics indicative of RF signals that emanated from a suspect device, in which the characteristics include periodicity, signal strength, transmission profile (i.e., advertised or inferred functionality), and transmitter manufacturer. The logic computes, based on the characteristics, a result indicative of whether the RF signals emanated from a suspect device, and renders the result for subsequent inspection and intervention to identify if an illicit capture device is present.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
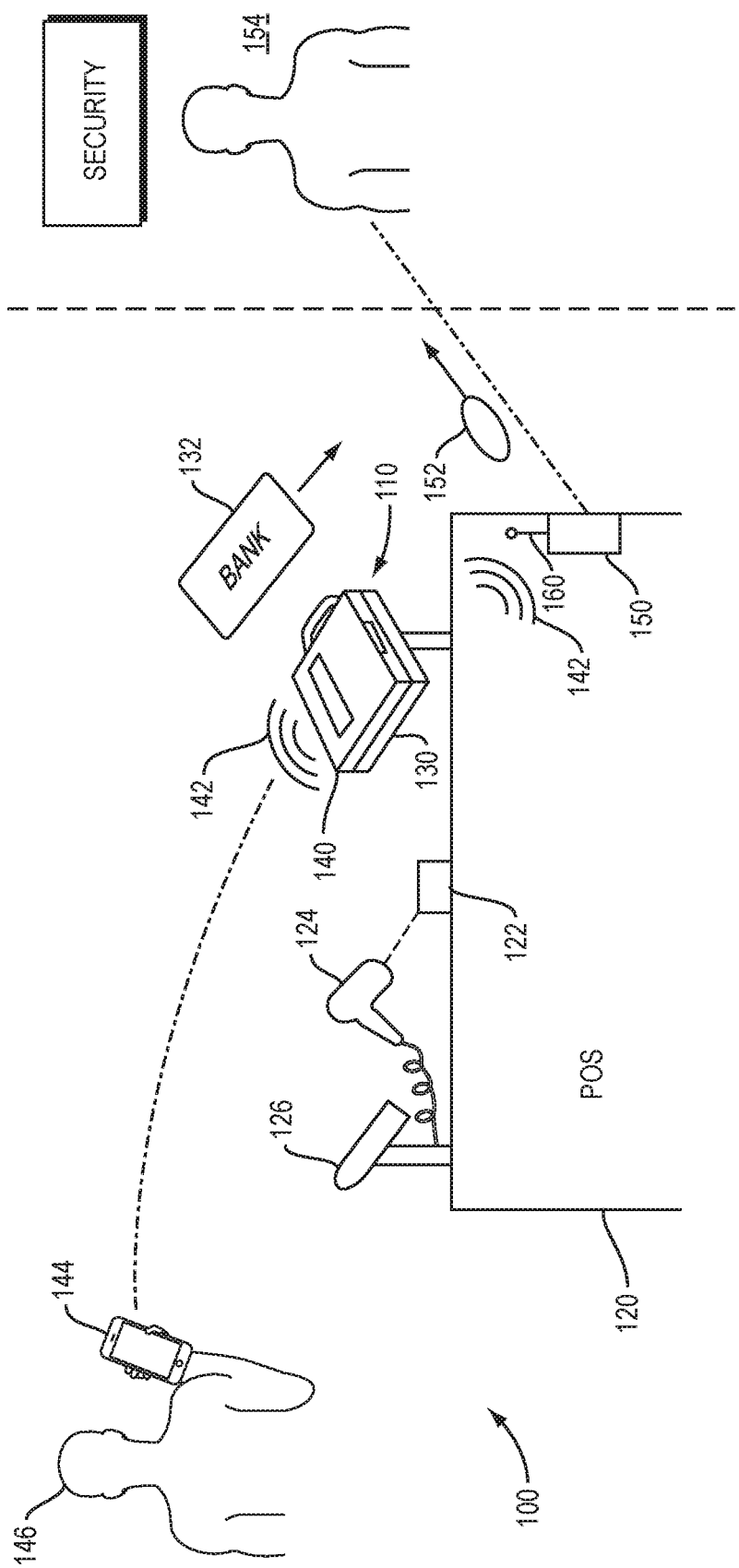
FIG. 1 is a context diagram of a monitoring environment suitable for use with configurations herein.

In the discussion that follows, an illicit capture device is an assembly commonly referred to as a skimmer or shimmer placed in close proximity to a payment authorization device as typically found for reading a credit card. A skimmer is a device that reads a magnetic strip (magstripe) on a payment card, and a shimmer reads an embedded chip, however other illicit capture devices may be employed for intercepting personal details exchanged in an electronic transaction through a bar or square code or RFID exchange, for example. Such devices are often placed just inside and in communication with the card slot or swipe area, to read the information from card or payment device engagement. Alternatively, they may be placed as an overlay on a payment card swipe or insertion region and are intended to match the contour of the device they attach to. ATM machines and gas stations are two common targets for such activity, as these contexts often avoid a third party such as an employee or clerk. This allows easier modification to place such a device either inside the payment reading mechanism or as an overlay. POS (point of sale) systems, more commonly known as a check-out or cash out station, are staffed computing devices, often on a counter, which include a card reader for swipe or insertion of a payment card. Illicit capture devices may also be attempted as an adjacent "sniffer" type of device that reads the exchanged information.

Personal information exchanged during a targeted transaction may include a payment card number, bank account number, name, address, and of course corresponding PINs (Personal Identification Number) and/or passwords. Often the illicit capture device allows the intended transaction to proceed, as in the case of an overlay where the personal information is read as the payment card passes through the overlay and read by the illicit capture device as it passes into the ATM or slides past the magnetic strip reader. In such cases, the user is not even alerted to the illicit capture of information since the underlying, intended transaction is allowed to occur, apparently without incident.

The illicit capture devices are typically designed to transmit the skimmed information to a nearby receiver, often a dedicated device or cellphone app for which the illicit capture device was designed to interact. The unscrupulous actors who placed the illicit capture devices do not want to return to manually collect the devices. Several patterns emerge from these skimmed information transmissions. BLUETOOTH® (BT) is often used, due to the low power requirements and low cost of components, compared to IP conversant hardware.

Configurations herein are designed to proactively detect the presence of illicit capture devices that covertly intercept payment card/device transaction information for subsequent transmission/download to a nearby receiver. Bluetooth transmissions that indicate a suspect device are further analyzed to determine if the suspect device is an illicit capture device or a benign Bluetooth device, such as a computer or a phone. The detection devices are intended to be deployed near the target devices (e.g. point-of-sale systems, ATM machines, gas station pumps) and persistently collect and analyze all Bluetooth traffic to identify the presence of a Bluetooth-enabled skimmer or shimmer. Detection may be based on at least 4 different features of skimmer/shimmer Bluetooth communications:

1) Point-of-sale skimmers/shimmers attempt to avoid detection by only turning on their Bluetooth modules at specific intervals. Detecting Bluetooth devices that are active with a very strict periodicity (e.g. 6:59 pm-7:09 pm every day) is an approach to detect them.

2) Analysis of skimmers and shimmers have found a common set of Bluetooth modules that are often employed. These modules can be identified while in operation by their BD_ADDR (a standard Bluetooth parameter). This can also eliminate certain devices as skimmers/shimmers from a list of known good BD_ADDRs (e.g. iPhones)

3) The devices that these the skimmers and shimmers are typically attached to, such as point-of-sale systems, ATM machines, and gas pumps, are stationary, which means the skimmer/shimmer is also stationary. The disclosed detection device is intended to be permanently placed in a location within range of the devices it is monitoring. Using the signal strength of a Bluetooth transmission, the detection device can identify a signal source is moving around, as well as generate rough estimates for how "close" it is to the detection device. Skimmers and shimmers should appear stationary and at a constant distance.

4) Bluetooth devices operate under one or more profiles. A profile represents a kind of functionality supported by the device. It has been observed that skimmers/shimmers often use the serial port profile (SPP) for communications. However, legitimate devices also use this profile, so other factors may be considered when assessing the maliciousness of a device, such as its device class. Device classes include computer, phone, A/V, etc.

While each of these features may be subject to a certain false positive rate, consideration of all of features gives a reliable metric to assess a likelihood that a given transmission is indicative of an illicit capture device. The likelihood may also be integrated into existing security monitoring approaches as an event or alert for triggering inspection and/or assistance.

FIG. 1 is a context diagram of a monitoring environment suitable for use with configurations herein. Referring to FIG. 1, in a monitored environment 100, a transaction involving personal information occurs at an exchange point 110 of a financial transaction. The transaction may occur at a POS station 120, where goods 122 for purchase are scanned via a scanner 124 by a POS computer system 126, or other exchange point such as gas stations and ATMs. The exchange point 110 is defined by a card reader 130 through which a credit/debit payment card 132 is swiped or inserted. An illicit capture device 140 may take the form of a skimmer or shimmer placed or overlaid on the card reader 130, or similar mechanism for intercepting/reading the sensitive information as it passes from the card 132 to the POS computer system 126.

The illicit capture device 140 is typically equipped to send transmissions 142 such as Bluetooth signals to a receiver 144 under the control of an unscrupulous actor 146 who placed the illicit capture device 140. The receiver 144 may be a cellphone app, dedicated device or other "hack" intended for receiving downloads of the sensitive information collected by the illicit capture device 140. Configurations herein teach a detection device 150 disposed adjacent or near the exchange point 110 for capturing and analyzing the transmissions 142. Once analyzed, the detection device 150 may send an alert 152 or notification to a security station 154 or attended log file for indicating a need to find and remove the illicit capture device 140.

Figure 2:
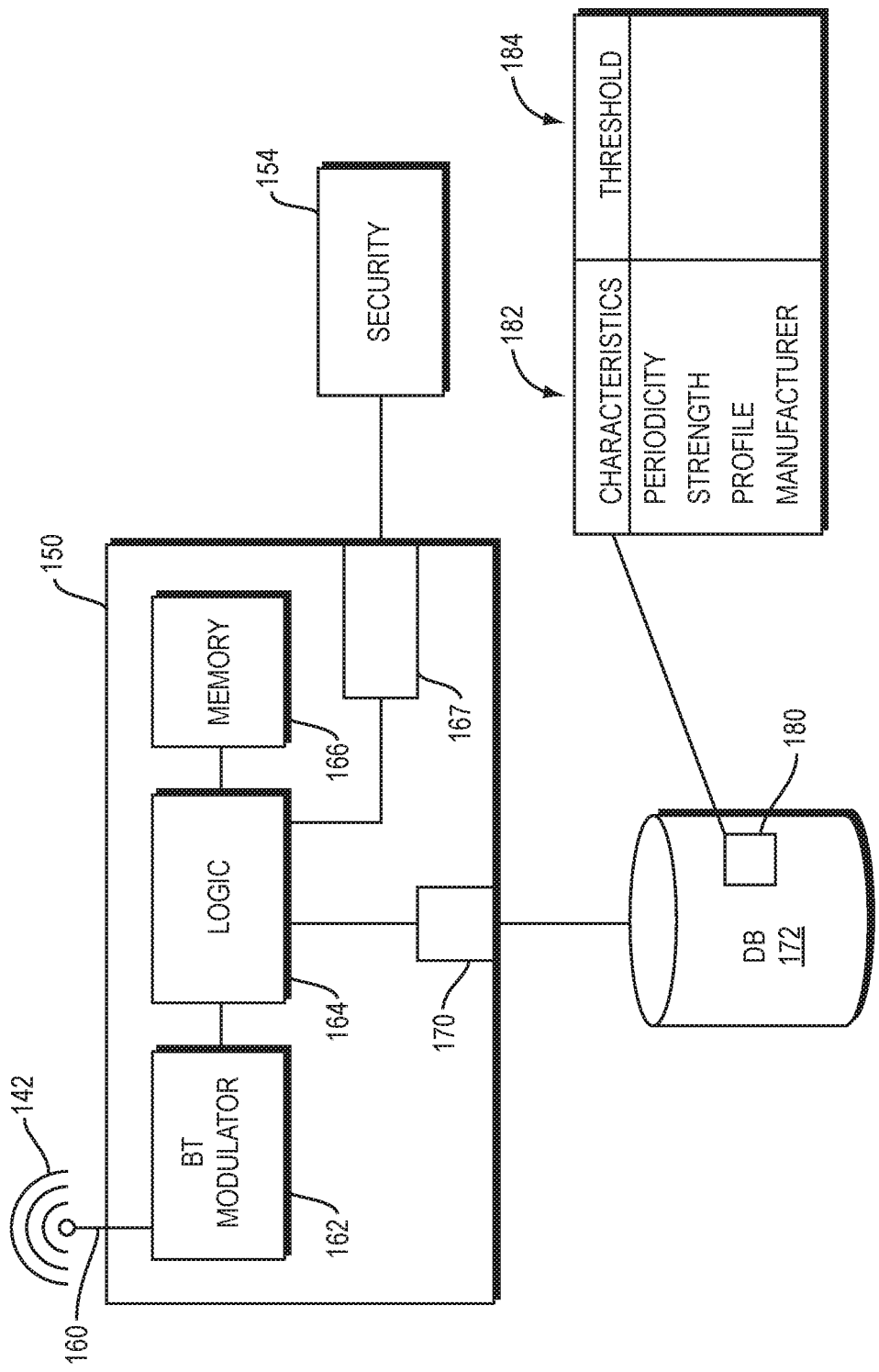
FIG. 2 is a block diagram of the device in the environment of FIG. 1.

FIG. 2 is a block diagram of the device in the environment of FIG. 1. Referring to FIGS. 1 and 2, the detection device 150 includes an antenna 160 for receiving RF signals 142 from the illicit capture device 140. A modulation circuit 162 demodulates the received RF signals 142 into packets of data. The RF signals include the modulated data indicative of personal information of a user transmitted in a Bluetooth or other format. Bluetooth is employed as an example since the low cost and simplicity of component use are well suited for amateur and homemade manufacturing of the typical illicit capture device 140. While Bluetooth has been observed as a preferred medium in such devices, the disclosed approach is applicable to other protocols, such as IP (Internet Protocol), ZigBee®, and Wi-Fi®.

Logic 164 is for interpreting the data from the packets, and for comparing the data to characteristics of known malicious devices having a capability for covert gathering of personal data. Based on the comparison of one or more of the characteristics, the logic 164 computes a likelihood that the RF signals emanated from an illicit or unauthorized device. Various heuristics and statistics may be employed for computing a likelihood of a presence of an illicit capture device 140, examples of which are discussed further below. In configurations herein, the logic 164 includes instructions for identifying transmission features indicative of the malicious device characteristics. In the example configuration, the features include periodicity, transmission hardware components, signal strength, and transmission profile.

The logic 164 is implemented by any suitable processor and programmed instruction set, and is coupled to memory 166 for storing results and intermediate computations. Multiple Bluetooth sources may be received, and the transmitted packets from different sources need to be organized so that, for example, periodicity of transmission from a particular source may be ascertained. Accordingly, the characteristics of RF transmissions/packets from multiple sources may need to be coalesced. Logic 164 operation is discussed further below with respect to FIGS. 3A-3C.

A database (DB) interface 170 may be invoked to access a repository 172 of characteristics consistent with illicit capture devices. Although any single characteristic may indicate an illicit capture device 140, some characteristics may be prone to false positives, and accordingly, multiple characteristics may be considered a sufficient matching criteria for indicating a likelihood of an illicit capture device. For example, using the four characteristics employed as an example herein, a positive indication on two of the four may trigger an alert for inspection. In an integration with a larger security system, a three tier indication, such as green, yellow and red coding, may be implemented. In this arrangement, thresholds may be established such as a single characteristic criteria triggers a green alert, matching on two criteria triggers a yellow match, and three matching characteristics trigger a red alert for an illicit capture device, or different characteristics may be given different weights based on their likelihoods of positive indication. A database 172 coupled to or contained within the detection device 150 may include a table 182 of typical characteristics. The table may include a list of characteristics 182 indicative of the illicit capture device 140, and corresponding thresholds 184 or match values that indicate or suggest a likelihood that a transmission bearing the characteristic emanated from an illicit capture device 140.

Figure 3A:
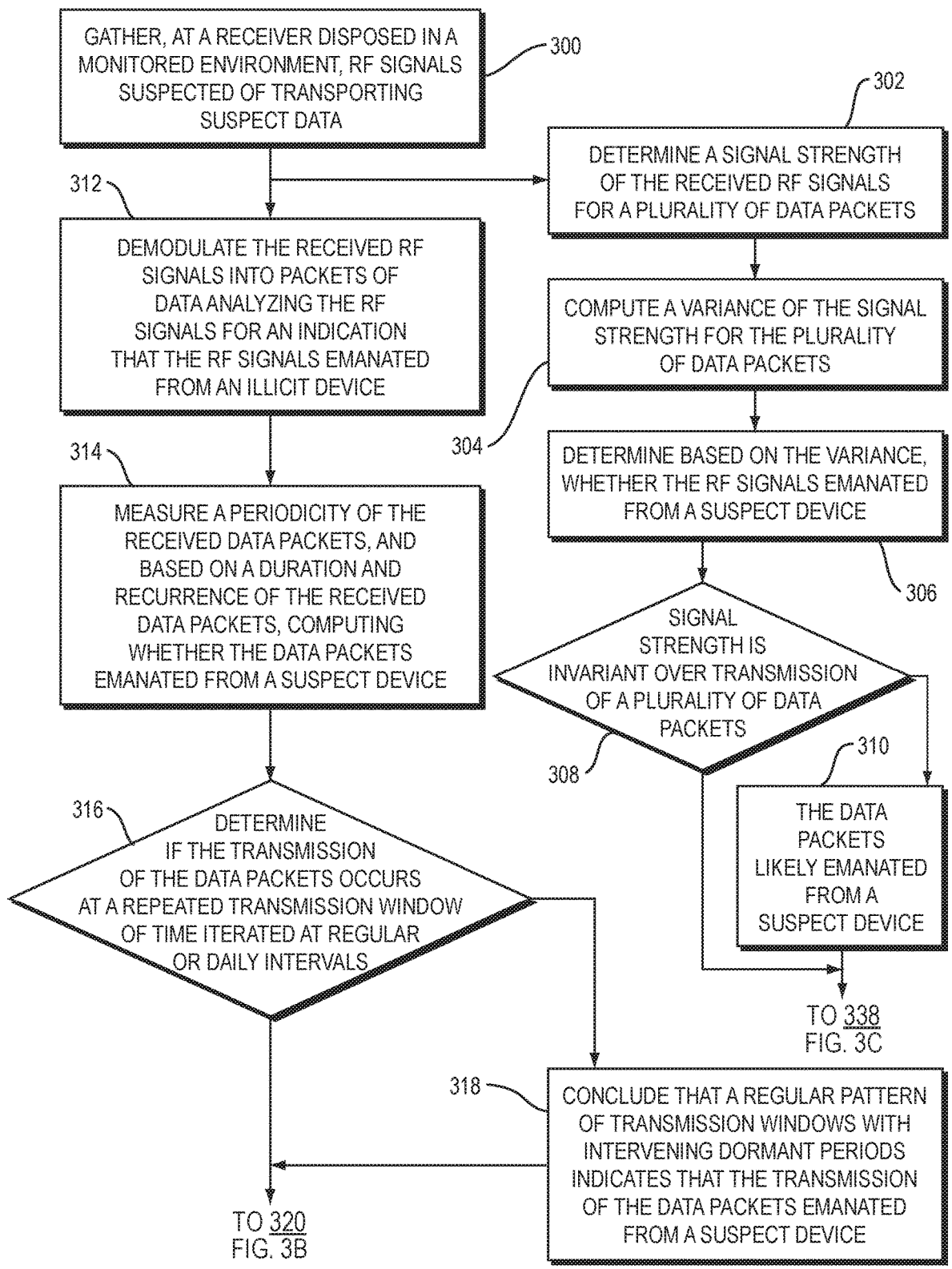
FIGS. 3A-3C are a flowchart of detecting logic as employed in the environment of FIG. 1.
Figure 3B:
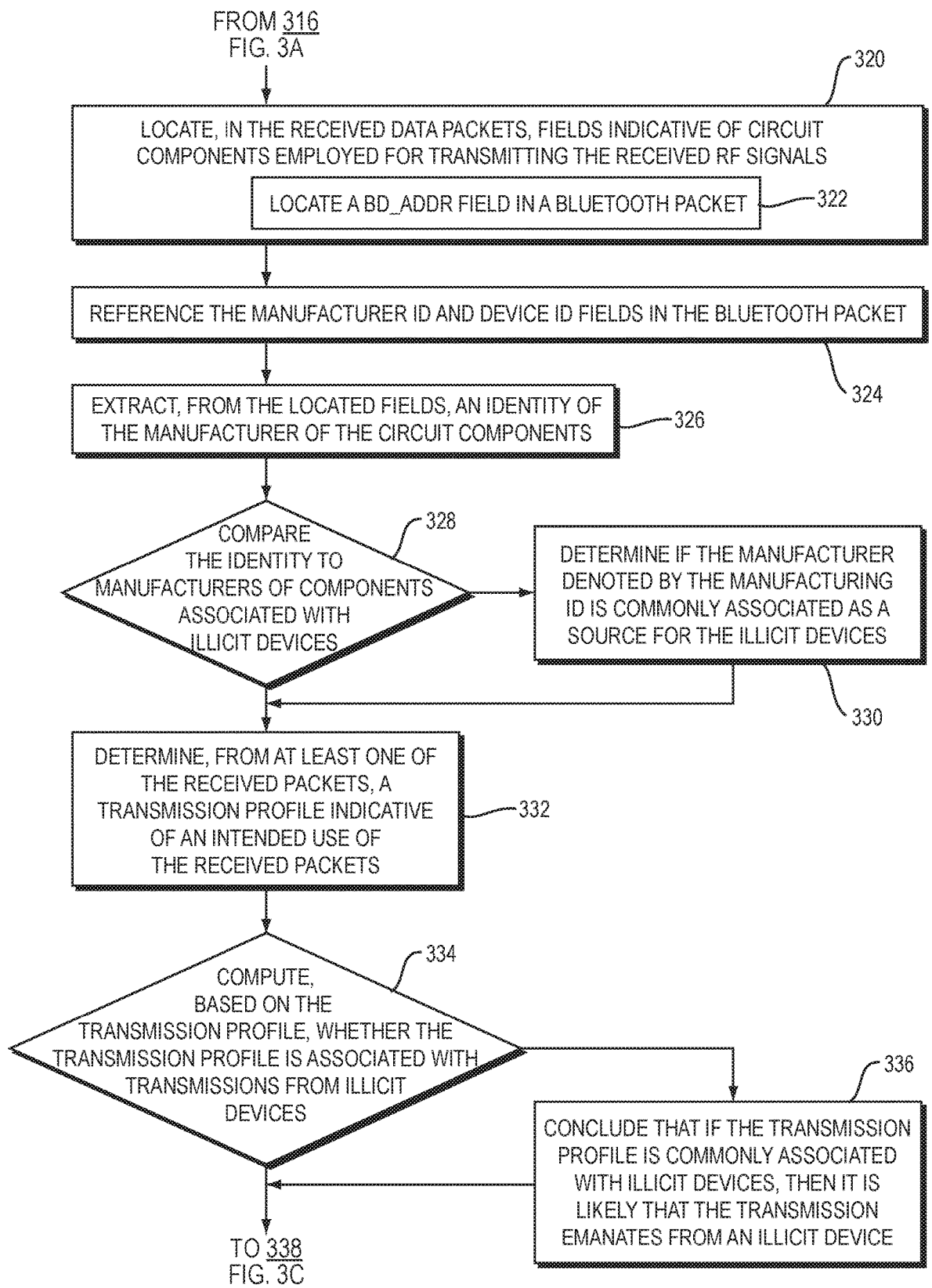
Figure 3C:
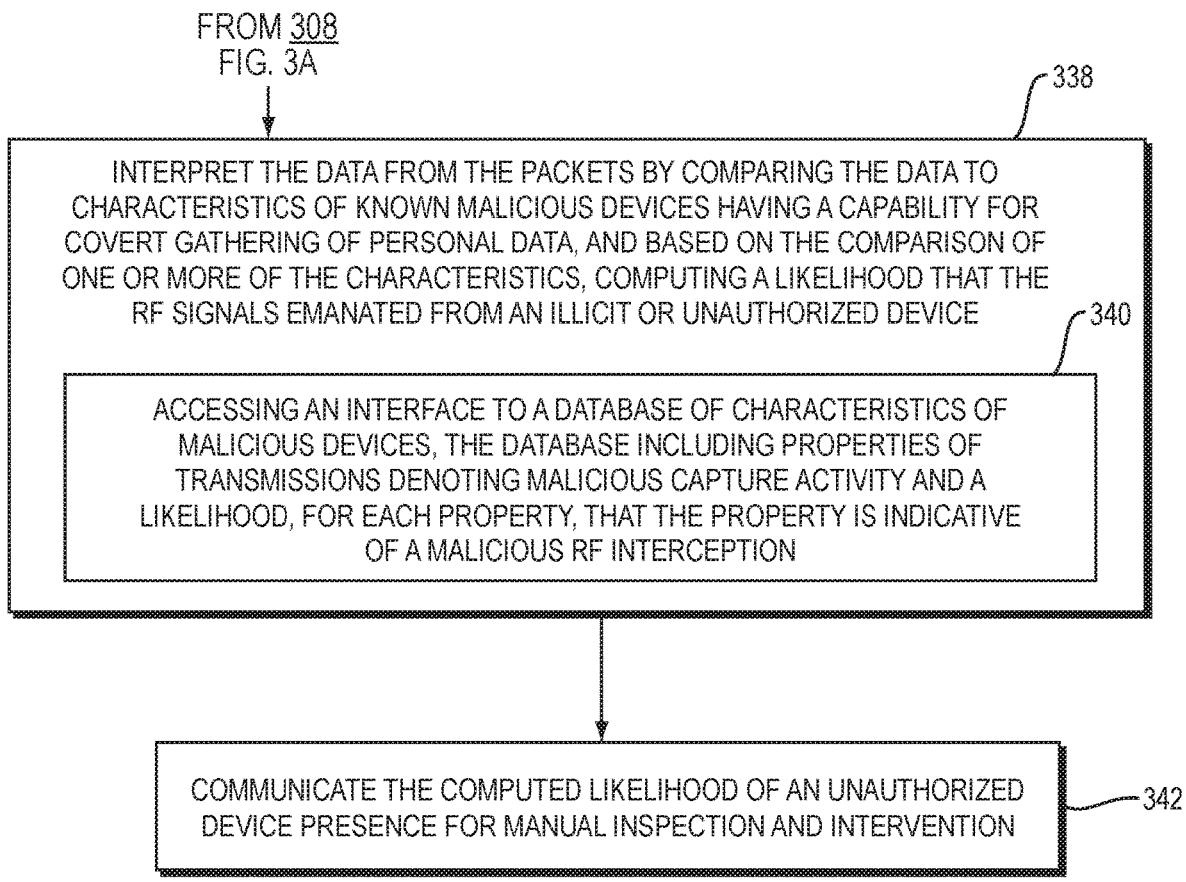

FIGS. 3A-3C are a flowchart of detecting logic as employed in the environment of FIG. 1. Referring to FIGS. 1-3C, once the detector device 150 is placed, it monitors ongoing RF transmissions in range, and identifies Bluetooth transmissions for analysis. At step 300, the Bluetooth modulator 162, already disposed in the monitored environment 100, gathers RF signals 142 via antenna 160 capable of transporting suspect data. In the monitoring environment, which may be a retail store or a mall with a large number of personal devices, a variety of RF signals may be present. The approach herein analyzes and identifies RF signals that exhibit characteristics that correlate with those of typical skimmer devices.

Upon receipt of the RF signals 142, the logic 164 determines a signal strength of the received RF signals for a plurality of data packets received, as depicted at step 302. The logic 164 computes a variance of the signal strength for the plurality of data packets, as disclosed at step 304, and determines, based on the variance, whether the RF signals emanated from a suspect or illicit capture device, as depicted at step 306.

It should be further noted that the RF signals occupy a frequency of 2.45 gigahertz (actually between 2.402 GHz and 2.480 GHz, to be exact). This frequency band has been set aside by international agreement for the use of industrial, scientific and medical devices (ISM). This frequency band tends to be heavily utilized by consumer electronics not only for Bluetooth, but also for WiFi transmissions. Analysis of the Bluetooth transmissions may occur either on the analog RF signals or on the demodulated data (digital), discussed further below at step 312. A separate band in the range of 5 GHz is also employed for certain 802.11 (WiFi, cellular, etc.) communications, and may also be scrutinized.

Based on the check at step 308, it is determined, if the signal strength is invariant over transmission of a plurality of data packets, then the data packets likely emanated from a suspect device, as depicted at step 310. Received signal strength can change based on the relative orientations of a transmitter and receiver as well as the distance between them. A varying power level suggests a device carried by an ambulatory user; conversely a stationary device such as a skimmer/overlay device exhibits a constant power level. Such devices would likely be set to transmit at the highest power available for the components employed in the illicit capture device 140 so that the recipient may be as distant as possible.

The modulation circuit 162 for demodulating the received RF signals 142 into packets of data at step 312. Demodulation extracts the digital packet structure so that the logic 164 may analyze the data transported in the RF signals 142 for an indication that the RF signals 142 emanated from an illicit capture device 140.

The logic 164 measures a periodicity of the received data packets, and based on a duration and recurrence of the received data packets, computes whether the data packets emanated from a suspect device, as shown at step 314. Periodicity refers to a regularity or cycle of transmission, such as a daily recurrence at the same time. A check is performed, at step 316, to determine if the transmission of the data packets occurs at a repeated transmission window of time iterated at regular intervals, as depicted at step 316. If so, the logic 164 concludes that a regular pattern of transmission windows with intervening dormant periods indicates that the transmission of the data packets are more likely to have emanated from a suspect device, as disclosed at step 318.

This periodicity detection sequence attempts to target signals that recur at a brief, repeatable window. Conventional technologies may scan for Bluetooth signals of the skimmers, however the actors that place such devices may evade detection of an additional Bluetooth source by scheduling a download of gathered personal information only at specific intervals, such as every 24 hours. Bluetooth signals that recur at regular, rigid intervals therefore indicate a match on the periodicity characteristic. From the perspective of the unscrupulous actor, they merely need to visit within a range of their illicit capture device 140 during the preset transmission window to download or receive captured information.

A further analysis operation includes locating, in the received data packets, fields indicative of circuit components employed for transmitting the received RF signals, as depicted at step 320. In the example configuration, this includes locating a BD_ADDR field in a Bluetooth packet, as shown at step 322. The BD_ADDR field is a standard Bluetooth field that identifies the manufacturer and unique device ID of the Bluetooth transmitter employed. The logic 164 references the Organizationally Unique Identifier (OUI) and device ID fields in the BD_ADDR, as shown at step 324. The logic 164 extracts, from the located fields, an identity of the manufacturer of the circuit components, as depicted at step 326, and a check is performed at step 328 to compare the identity to manufacturers of components associated with illicit capture devices.

It has been shown that the illicit capture devices 140 tend to utilize certain Bluetooth transmitters and other components from certain manufacturers. These transmitters are often readily-available, encapsulated Bluetooth modules that are as easy to integrate into a system as soldering a few wires. Based on the check at step 328, the analysis determines if the manufacturer denoted by the manufacturing ID is commonly associated as a source for the illicit devices, as shown at step 330. For example, the database interface 170 could be invoked to reference the database 172 including a list of manufacturer IDs often associated with illicit capture devices 140. Table 180 may be invoked for matching values 184 of the manufacturer IDs that are popular for skimmer devices.

A further indication is obtained by determining, from at least one of the received packets, a transmission profile indicative of an intended use of the received packets, as depicted at step 332. Bluetooth transmissions may be designated for a particular usage, such as cellphone, headphones, speaker and other designations to efficiently package the Bluetooth data for transmission. A profile indicator can be identified in the Bluetooth setup/initialization messages. A profile is available, designated as a serial port profile, which operates as a general serial data transmission protocol to operate in any context, and refers to an RS-232 type of connection which has existed for many years. Illicit capture devices 140 have a pattern of employing the serial port profile. Accordingly, a check is performed, at step 334, to compute, based on the transmission profile, whether the transmission profile is associated with transmissions from illicit devices. Based on this, the analysis concludes that if the transmission profile is commonly associated with illicit capture devices, then it is more likely that the transmission emanates from an illicit capture device. For example, research has indicated that skimmer/shimmers often employ a serial port profile, while legitimate communications employ a device or type specific protocol. If the transmission profile designates a serial port protocol, then it is likely that the transmission emanates from an illicit device, as depicted at step 336. Other profiles may be flagged in the future as they are correlated to illicit devices, and other information, such as the device class of the device, may be used to increase the confidence that the device is illicit. In particular, an observed trend concerning profiles that tend to be employed in illicit devices has been observed, and these profiles differ from those used by legitimate uses, and analysis of this profile assists in detecting an illicit capture device.

The logic 164 evaluates each of the checks above, as it is likely that a single aspect alone may not be deterministic of an illicit capture device 140 presence. The logic 164 interprets the data from the packets comparing the data to characteristics of known malicious devices having a capability for covert gathering of personal data, and based on the comparison of one or more of the characteristics, computes a likelihood that the RF signals emanated from an illicit or unauthorized device, as depicted at step 338. The logic 164 may access the interface 170 to the database 172 including characteristics of malicious devices, such that the database includes properties of transmissions denoting malicious capture activity and a likelihood, for each property, that the property is indicative of a malicious RF interception, as disclosed at step 340. Table 180 may be expanded to cover additional characteristics identified for skimmer devices.

The overall analysis of isolating potentially suspect transmissions from among all that may be available to the detection device 150 may include the factors discussed above as well as others. A particularly beneficial use has been exhibited by the generalized heuristics herein to identify skimmers/shimmers: to identify Bluetooth devices that appear and disappear with a very specific periodicity, to locate the BD_ADDR of Bluetooth modules known to be in skimmers, to monitor the signal strength of the Bluetooth device to determine if it is a stationary position relative to the detection device 150, and to probe identified Bluetooth devices to detect the use of Bluetooth profiles observed to be used by skimmers/shimmers. If the collective analysis of the considered features indicates a significant likelihood of transmissions from an illicit capture device 140, the detection device 150 invokes the interface 167 for communicating the computed likelihood of an unauthorized device presence to a central monitoring station, security office 154 or similar oversight authority for manual inspection and intervention, as depicted at step 342.

Those skilled in the art should readily appreciate that the programs and methods defined herein are deliverable to a user processing and rendering device in many forms, including but not limited to a) information permanently stored on non-writeable storage media such as ROM devices, b) information alterably stored on writeable non-transitory storage media such as floppy disks, magnetic tapes, CDs, RAM devices, and other magnetic and optical media, or c) information conveyed to a computer through communication media, as in an electronic network such as the Internet or telephone modem lines. The operations and methods may be implemented in a software executable object or as a set of encoded instructions for execution by a processor responsive to the instructions. Alternatively, the operations and methods disclosed herein may be embodied in whole or in part using hardware components, such as Application Specific Integrated Circuits (ASICs), Field Programmable Gate Arrays (FPGAs), state machines, controllers or other hardware components or devices, or a combination of hardware, software, and firmware components.

While the system and methods defined herein have been particularly shown and described with references to embodiments thereof, it will be understood by those skilled in the art that various changes in form and details may be made therein without departing from the scope of the invention encompassed by the appended claims.

What is claimed is:

1. A device for detecting and countering an illicit capture device, comprising:
   an antenna for receiving RF signals from the illicit capture device, the RF signals including data indicative of personal information of a user;
   a modulation circuit for demodulating the received RF signals into packets of data;
   logic for receiving and interpreting a transmission profile indicative of an intended use of the received packets from the data in the packets, the logic for comparing the data to characteristics of known malicious devices having a capability for covert gathering of personal data, and based on the comparison of one or more of the characteristics, computing, based on the transmission profile, whether the transmission profile is associated with transmissions from illicit capture devices and computing a likelihood that the RF signals emanated from a deployed, illicit capture device; the logic further comprising:
locating, in the received data packets, fields indicative of circuit components employed for transmitting the received RF signals;
extracting, from the located fields, an identity of a manufacturer of the circuit components based on a BD_ADDR field in a Bluetooth packet, referencing the Organizationally Unique Identifier (OUI) and device ID fields in the Bluetooth packet; and
comparing the identity to manufacturers of components associated with illicit capture devices;
the received packets including captured, sensitive data from the illicit capture device and based on proximity to a point of exchange of the sensitive data; and
an interface for communicating the computed likelihood of an unauthorized device presence for manual inspection and intervention.

2. The device of claim 1 wherein the logic includes instructions for identifying transmission features indicative of the malicious device characteristics, the features including periodicity, transmission hardware components, signal strength, and transmission profile.

3. The device of claim 1 wherein the logic includes instructions for measuring a periodicity of the received data packets, and based on a duration and recurrence of the received data packets, computing whether the data packets emanated from a suspect device.

4. The device of claim 1 wherein the logic includes instructions for:
determining a signal strength of the received RF signals for a plurality of data packets;
computing a variance of the signal strength for the plurality of data packets; and
determining, based on the variance, whether the RF signals emanated from a suspect device.

5. The device of claim 1, wherein the logic is further operable to conclude that if the transmission profile designates a serial port protocol, then there is a likelihood that the transmission emanates from an illicit capture device.

6. The device of claim 4 wherein the logic further includes instructions for determining, if the signal strength is invariant over transmission of a plurality of data packets, then the data packets likely emanated from a suspect device.

7. The device of claim 3 wherein the logic further includes instructions for:
determining if the transmission of the data packets occurs at a repeated transmission window of time iterated at regular or daily intervals; and
concluding that a regular pattern of transmission windows with intervening dormant periods indicates that the transmission of the data packets emanated from a suspect device.

8. The device of claim 1 wherein the received RF signals are modulated to include Bluetooth transmissions in the range of 2.402 GHz to 2.480 GHz.

9. The device of claim 1 further comprising an interface to a database of characteristics of malicious devices, the database including properties of transmissions denoting malicious capture activity and a likelihood, for each property, that the property is indicative of a malicious RF interception.

10. A method for detecting spurious communications from an unauthorized device, comprising:
gathering, at a receiver disposed in a monitored environment, RF signals suspected of transporting sensitive data;
analyzing the RF signals for received packets including an indication that the RF signals emanated from an illicit device, analyzing further comprising:
deriving one or more characteristics indicative of RF signals that emanated from a suspect device, the characteristics including periodicity, signal strength, a transmission profile indicative of an intended use of the received packets, and transmitter manufacturer, including:
locating, in the received data packets, fields indicative of circuit components employed for transmitting the received RF signals;
extracting, from the located fields, an identity of a manufacturer of the circuit components based on a BD_ADDR field in a Bluetooth packet,
referencing the Organizationally Unique Identifier (OUI) and device ID fields in the Bluetooth packet; and
comparing the identity to manufacturers of components associated with illicit capture devices;
computing, based on the characteristics, whether the transmission profile is associated with transmissions from illicit capture devices including a likelihood of whether the received packets include captured, sensitive data from the illicit capture device and based on proximity to a point of exchange of the sensitive data; and
rendering the result for subsequent inspection and intervention.

11. The method of claim 10 further comprising deriving characteristics indicative of periodicity, transmission hardware components, signal strength, and transmission profile.

12. The method of claim 10 wherein deriving the characteristics includes measuring a periodicity of the received data packets, and based on a duration and recurrence of the received data packets, computing whether the data packets emanated from a suspect device.

13. The method of claim 10 wherein analyzing the RF signals further includes:
determining a signal strength of the received RF signals for a plurality of data packets;
computing a variance of the signal strength for the plurality of data packets; and
determining, based on the variance, whether the RF signals emanated from a suspect device.

14. The method of claim 10 further comprising receiving RF signals modulated to include Bluetooth transmissions in the range of 2.402 GHz to 2.480 GHz.

15. A computer program embodying program code on a non-transitory medium that, when executed by a processor, performs steps for implementing a method of detecting spurious communications from an illicit capture device, the method comprising:
gathering, at a receiver disposed in a monitored environment, RF signals suspected of transporting sensitive data;
analyzing the RF signals for received packets including an indication that the RF signals emanated from an illicit device, analyzing further comprising:
deriving one or more characteristics indicative of RF signals that emanated from a suspect device, the characteristics including periodicity, signal strength, a transmission profile indicative of an intended use of the received packets, and transmitter manufacturer; including:

locating, in the received data packets, fields indicative of circuit components employed for transmitting the received RF signals;

extracting, from the located fields, an identity of the manufacturer of the circuit components based on a BD_ADDR field in a Bluetooth packet, referencing the Organizationally Unique Identifier (OUI) and device ID fields in the Bluetooth packet; and comparing the identity to manufacturers of components associated with illicit capture devices;

computing, based on the characteristics, whether the transmission profile is associated with transmissions from illicit capture devices including a likelihood of whether the received packets include captured, sensitive data from the illicit capture device and based on proximity to a point of exchange of the sensitive data; and rendering the result for subsequent inspection and intervention.

16. The device of claim 1, wherein the packets contain data retrieved based on a copy resulting from a physical exchange with a source of the captured sensitive data.

17. The device of claim 1, wherein the packet contains the sensitive data resulting from:

physical engagement of a personal storage device including the sensitive data of the targeted individual; and copying the sensitive data from the personal storage device.

* * * * *